US011843524B2

(12) United States Patent
Venkataramu et al.

(10) Patent No.: US 11,843,524 B2
(45) Date of Patent: *Dec. 12, 2023

(54) METHOD AND SYSTEM FOR SELECTION AND ORCHESTRATION OF MULTI-ACCESS EDGE COMPUTING RESOURCES

(71) Applicant: Verizon Patent and Licensing Inc., Basking Ridge, VA (US)

(72) Inventors: Praveen Venkataramu, Raritan, NJ (US); Utpal Khanvilkar, Basking Ridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/306,262

(22) Filed: May 3, 2021

(65) Prior Publication Data
US 2021/0258231 A1 Aug. 19, 2021

Related U.S. Application Data

(63) Continuation of application No. 16/663,619, filed on Oct. 25, 2019, now Pat. No. 11,032,163.

(51) Int. Cl.
*H04L 41/5041* (2022.01)
*H04L 41/5019* (2022.01)
(Continued)

(52) U.S. Cl.
CPC ...... *H04L 41/5041* (2013.01); *H04L 41/0893* (2013.01); *H04L 41/5019* (2013.01);
(Continued)

(58) Field of Classification Search
CPC ............ H04L 41/5041; H04L 43/03893
See application file for complete search history.

(56) References Cited

U.S. PATENT DOCUMENTS 10,230,685 B2  3/2019 Simon et al.
10,440,096 B2 10/2019 Sabella et al.
(Continued)

FOREIGN PATENT DOCUMENTS

CN        113132897         7/2021
WO    WO-2018089417 A1 *  5/2018
WO       2021/135663        7/2021

OTHER PUBLICATIONS

"Why Should I use an FQDN instead of the server's IP address?", ServerFault, https://serverfault.com/questions/788862/why-should-i-use-an-fqdn-instead-of-the-servers-ip-address, Jul. 2016.
(Continued)

*Primary Examiner* — Nicholas P Celani

(57) ABSTRACT

Systems and methods described herein direct an end device to a multi-access edge computing (MEC) service instance among MEC instances with different service levels for different geographic areas. A network device stores a map of a geographic area with unique identifiable regions (UIRs) that each include cells for different wireless stations of a transport network. The network device receives application parameters, for a designated coverage area, for an application to be serviced using MEC resources. The network device associates the designated coverage area with one or more target UIRs from the map and deploys, when the MEC resources are available to support the application parameters, an instance of the application at a MEC cluster. The deployed instance of the application meets the application parameters for the target UIRs. The network device updates a MEC-domain name service (DNS) for the deployed instance of the application at the MEC cluster.

20 Claims, 10 Drawing Sheets

(51) Int. Cl.
*H04L 41/0893* (2022.01)
*H04L 61/4511* (2022.01)
*H04L 67/52* (2022.01)
*H04L 67/1021* (2022.01)

(52) U.S. Cl.
CPC ...... *H04L 61/4511* (2022.05); *H04L 67/1021* (2013.01); *H04L 67/52* (2022.05)

(56) References Cited

U.S. PATENT DOCUMENTS

| | | | |
|---|---|---|---|
| 11,290,548 | B2 | 3/2022 | Ppallan et al. |
| 2004/0186850 | A1 | 9/2004 | Chowdhury et al. |
| 2008/0159262 | A1 | 7/2008 | Crable et al. |
| 2008/0288470 | A1 | 11/2008 | Goutard et al. |
| 2009/0089426 | A1 | 4/2009 | Yamasaki et al. |
| 2009/0245277 | A1 | 10/2009 | Kawada et al. |
| 2010/0281151 | A1 | 11/2010 | Ramankutty et al. |
| 2012/0142278 | A1* | 6/2012 | Wang ............... H04W 36/125 455/68 |
| 2014/0206403 | A1 | 7/2014 | Buckley et al. |
| 2014/0307682 | A1* | 10/2014 | Xiong ............. H04W 72/0406 370/329 |
| 2018/0027060 | A1 | 1/2018 | Metsch et al. |
| 2018/0109590 | A1* | 4/2018 | Rao ................... H04L 67/289 |
| 2018/0183855 | A1 | 6/2018 | Sabella et al. |
| 2019/0026450 | A1 | 1/2019 | Egner et al. |
| 2019/0041824 | A1 | 2/2019 | Chavez et al. |
| 2019/0075480 | A1 | 3/2019 | Mittal |
| 2019/0104030 | A1 | 4/2019 | Giust et al. |
| 2019/0220703 | A1 | 7/2019 | Prakash et al. |
| 2019/0254108 | A1 | 8/2019 | Iwai et al. |
| 2020/0120446 | A1 | 4/2020 | Stammers et al. |
| 2020/0145316 | A1 | 5/2020 | Sosthène Enguehard et al. |
| 2020/0167258 | A1 | 5/2020 | Chattopadhyay et al. |
| 2020/0177683 | A1 | 6/2020 | Zhao et al. |
| 2020/0187182 | A1 | 6/2020 | Shimojou et al. |
| 2020/0244722 | A1 | 7/2020 | Jeuk et al. |
| 2020/0389531 | A1 | 12/2020 | Lee et al. |
| 2021/0227427 | A1 | 7/2021 | Mishra et al. |
| 2021/0250250 | A1 | 8/2021 | Reznik |
| 2022/0124147 | A1 | 4/2022 | Ge et al. |
| 2022/0201597 | A1 | 6/2022 | Kim et al. |
| 2022/0278955 | A1 | 9/2022 | Roy et al. |

OTHER PUBLICATIONS

Chang, et al., "Analyzing MEC Architectural Implications for LTE/LTE-A", May 4, 2016, EURECOM, Department of Mobile Communications.

Cullings, "What's a Fully Qualified Domain Name (FQDN) and what's it good for?", https://www.godaddy.com/garage/whats-a-fully-qualified-domain-name-fqdn-and-whats-it-good-for/, Jul. 10, 2017.

Okada, et al., "GoEdge: A Scalable and Stateless Local Breakout Method", Topic 2018, Jul. 27, 2018, ACM Publishing.

Singh, "Optimize Cloud Computations using Edge Computing", 2017 International Conference on Big Data, IoT and Data Science (BID) Vishwakarma Institute of Technology, Pune, Dec. 20-22, 2017.

"Mobile Edge Computing (MEC); Framework and Reference Architecture ETSI GS MEC 003 v1.1.1", ETSI GS MEC 003 v1.1.1, Mar. 2016.

Cattaneo, et al., "Deploying CPU Intensive Applications on MEC in NFV Systems: The Immersive Video Case", Computers 2018, 7, 55. https://doi.org/10.3390/computers7040055.

Giust, et al., "MEC Deployments in 4G and Evolution Towards 5G", ETSI White Paper No. 24, First edition—Feb. 2018.

Hernandez-Ramos, et al., "A Policy Based Framework in Fog enabled Internet of Things for Cooperative ITS", Global IoT Summit, Jun. 17, 2019.

Sabella, et al., "Developing Software for Multi-Access Edge Computing", ETSI White Paper No. 20, 2nd edition—Feb. 2019.

* cited by examiner

| APPLICATION POLICY | MEC Target Coverage Area (1) | MEC Target Coverage Area (2) | ... |
|---|---|---|---|
| Application Service | | | |
| Round Trip Delay | | | |
| Guaranteed Minimum Throughput | | | |
| Data Burst Volume | | | |
| Resource (Compute, Storage, Service) | | | |
| Transport type | | | |
| Reliability | | | |
| Backhaul Connectivity to Cloud | | | |
| Cost Limit | | | |

FIG. 5

METHOD AND SYSTEM FOR SELECTION AND ORCHESTRATION OF MULTI-ACCESS EDGE COMPUTING RESOURCES

CROSS-REFERENCE TO RELATED APPLICATION

This application is a continuation of U.S. patent application Ser. No. 16/663,619, filed on Oct. 25, 2019, and titled "Method and System for Selection and Orchestration of Multi-Access Edge Computing Resources," the contents of which are incorporated herein by reference.

BACKGROUND

Multi-access Edge Computing (MEC) (also known as mobile edge computing) is being developed in which some network capabilities previously implemented in a core network or cloud network (e.g., computation, storage, transport, etc.) are situated at the network edge to improve latency and reduce traffic being sent to the core network. Additionally, other technologies, such as cloud computing, software defined networking (SDN), etc., are also being explored to provision services and applications to various end devices and end users.

Applications may be configured with a subscription to MEC services to provide an optimal user experience for the end user. Application developers/providers may select service levels for their applications that use MEC services, defining parameters such as a minimum latency requirement and a minimum number of service instances for their application.

BRIEF DESCRIPTION OF THE DRAWINGS

FIG. 5 is an example of fields that may be included in the application policy of FIG. 4;

DETAILED DESCRIPTION OF EXAMPLE EMBODIMENTS

Figure 1:
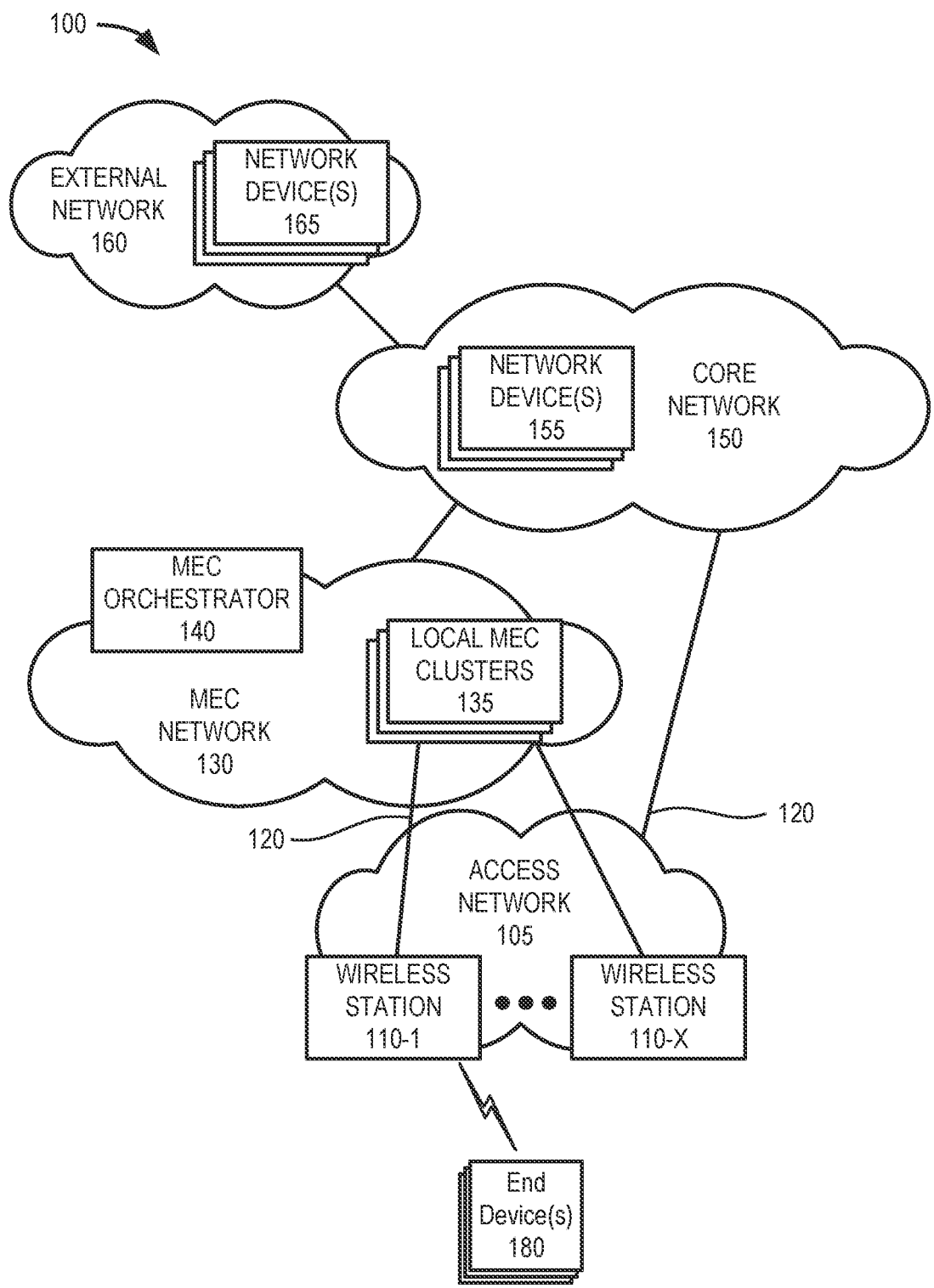
FIG. 1 illustrates an exemplary environment in which systems and methods described herein may be implemented.

The following detailed description refers to the accompanying drawings. The same reference numbers in different drawings may identify the same or similar elements. Also, the following detailed description does not limit the invention.

Multi-access Edge Computing (MEC) servers allow high network computing loads to be transferred onto a network edge. Depending on the location of the edge servers relative to the point of attachment (e.g., a wireless station for an end device), MEC servers may provide various services and applications to end devices with minimal latency. The MEC servers can provide applications (e.g., applications being executed on mobile devices) with compute, storage, and transport resources near a network edge and are particularly well-suited for applications with low-latency, localized compute, and localized storage requirements. Generally, lower latencies are achieved when MEC resources are positioned with shorter physical distances to the network edge. Thus, service providers are establishing MEC resources in multiple geographic regions to minimize latency for services to mobile devices and guarantee certain quality-of-service (QoS) levels.

A customer (e.g., an application provider) may register with a service provider to make an application available for MEC services. For each application, the customer may select an application policy that defines service parameters, such as achieving certain key performance indicators (KPIs) and/or service level agreements (SLAs) for MEC services. In some cases, a customer may select different KPIs and SLAs for different geographic regions. For example, a customer may set a regional application policy that provides a premium level of service, with a round-trip delay time (RTT) of less than 30 milliseconds (among other parameters), for users in New York City. In contrast, the customer's application policy may require a less-stringent RTT of up to 75 milliseconds for users in the surrounding suburbs and other areas.

To ensure that an application achieves the required SLA for users in different locations, application services (e.g., computation, storage, transport, etc. for the particular application) may be deployed in different MEC locations. Currently, there are limitations for an application provider to tell which MEC clusters can satisfy the SLA requirements for a given end device at a given location. Thus, there is a need for a MEC orchestrator that utilizes cellular network intelligence to derive the right control points and that enable the network to select an appropriate MEC cluster for an end device in a given area.

Systems and methods described herein direct an end device to a MEC service instance among multiple MEC instances with different service levels for different geographic areas. A network device stores a map of a geographic area with unique identifiable regions (UIRs) that each include cells for different wireless stations of a transport network. The network device receives application parameters, for a designated coverage area, for an application to be serviced using MEC resources. The network device associates the designated coverage area with one or more target UIRs from the map and deploys, when the MEC resources are available to support the application parameters, an instance of the application at a MEC cluster. The deployed instance of the application meets the application parameters for the target UIRs. The network device updates a MEC-domain name service (DNS) for the deployed instance of the application at the MEC cluster.

FIG. 1 illustrates an exemplary environment 100 in which systems and methods described herein may be implemented. As illustrated, environment 100 includes an access network 105, a MEC network 130, a core network 150, and an external network 160. Access network 105 may include wireless stations 110-1 through 110-X (referred to collectively as wireless stations 110 and generally as wireless station 110). MEC network 130 may include local MEC clusters 135 and a MEC orchestrator 140. Core network 150 may include network devices 155, and external network 160 may include network devices 165. Environment 100 further includes one or more end devices 180. Access network 105, MEC network 130, and core network 150 may be collectively referred to herein as a transport network.

The number, the type, and the arrangement of network devices and the number of end devices 180 in environment 100 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between end devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) Radio Access Network (RAN), a Fourth Generation (4G) RAN, a 4.5G RAN, and/or another type of future generation RAN. By way of further example, access network 105 may be implemented to include a Next Generation (NG) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to an implementation, wireless stations 110 may include a gNB with multiple distributed components, such as a central unit (CU), a distributed unit (DU), a remote unit (RU or a remote radio unit (RRU)), or another type of distributed arrangement. Wireless stations 110 may connect to core network 150 and/or MEC network 130 via backhaul links 120, such as wired or optical links. According to various embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

MEC network 130 includes a platform that provides services at the edge of a network, such as access network 105. MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Local MEC clusters 135 include the various types of network devices that may be deployed in different areas/regions of MEC network 130. Each MEC cluster 135 includes a platform that provides an application service. MEC clusters 135 may include virtual network devices (e.g., virtualized network functions (VNFs), servers, hosts, containers, hypervisors, virtual machines, network function virtualization infrastructure (NFVI), and/or other types of virtualization elements, layers, hardware resources, operating systems, engines, etc.) and associated application services for use by end devices 180. MEC clusters 135 may be located to provide geographic proximity to various groups of wireless stations 110. In some instances, MEC clusters 135 may be co-located with wireless stations 110 or network devices 155. Alternatively, MEC cluster 135 may not be co-located.

MEC orchestrator 140 may include logic that provides MEC selection and orchestration among MEC clusters 135. According to an implementation, MEC orchestrator 140 may be a centralized component for MEC network 130. For example, MEC orchestrator 140 may be co-located with one or more network devices 155 of core network 150. MEC orchestrator 140 may maintain an overlay grid over an entire geographic coverage area. The grid may divide the geographic coverage area into uniquely identifiable regions (UIRs). According to an implementation, MEC orchestrator 140 may track the KPIs/parameters that are used to define a customer's MEC application policy for each UIR or group of UIRs. Accordingly, a customer may define different application policies for different geographic regions. MEC orchestrator 140 is described further below in connection with, for example, FIG. 2.

Core network 150 may include one or multiple networks of one or multiple network types and technologies to support access network 105. For example, core network 150 may be implemented to include a next generation core (NGC) network for a 5G network, an Evolved Packet Core (EPC) of an LTE network, an LTE-A network, an LTE-A Pro network, and/or a legacy core network. Depending on the implementation, core network 150 may include various network devices 155 to provide, for example, a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultralow-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices 165. For example, external devices 165 may provide various applications, services, or other type of end device assets, such as servers (e.g., web, application, cloud, etc.), mass storage devices, data center devices, and/or other types of network devices pertaining to various network-related functions.

End device 180 includes a device that has computational and wireless communication capabilities. End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a wearable device, a vehicle support system, a game system, a drone, or some other type of wireless device. According to various exemplary embodiments, end device 180 may be configured to execute various types of software (e.g., applications, programs, etc.), such as an application client for an application that receives service from MEC network 130 and/or external network 160. End device 180 may support one or multiple radio access technologies (RATs, e.g., 4G, 5G, etc.), one or multiple frequency bands, network slicing, dual-connectivity, and so forth. Additionally, end device 180 may include one or multiple communication interfaces that provide one or multiple (e.g., simultaneous or non-simultaneous) connections via the same or different RATs, frequency bands, etc.

Figure 2:
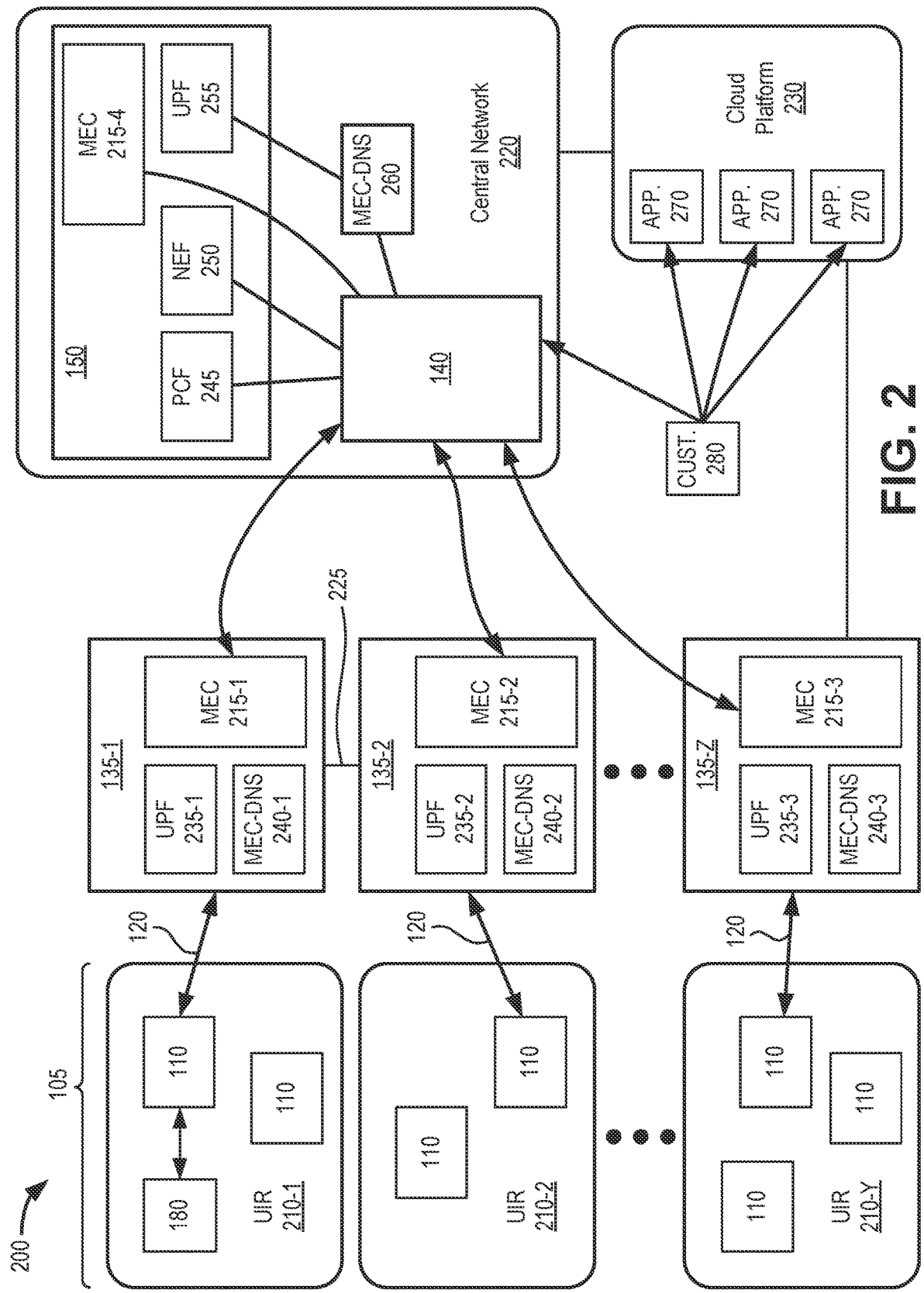
FIG. 2 is a diagram of exemplary network connections in a portion of the environment of FIG. 1.

FIG. 2 is a diagram of exemplary network connections in a network portion 200 of environment 100. As shown in FIG. 2, network portion 200 may include multiple unique identifiable regions (UIRs) 210-1 through 210-Y (referred to collectively as UIRs 210 and generally as UIR 210), each containing one or more wireless stations 110. Network portion 200 may also include MEC clusters 135-1 through 135-Z (referred to collectively as MEC clusters 135 and generally as MEC cluster 135), a central network 220, a cloud platform 230, and a customer device 280.

Each UIR 210 may include a geographic area serviced by one or more wireless stations 110. For example, a UIR 210 may include a metropolitan area, a city, a geographic area associated with a postal zip code, etc. The specific area of a UIR 210 may be defined, for example, based on the coverage of the particular wireless stations 110 (or cells) within the UIR. Accordingly, multiple wireless stations 110 may be assigned to a single UIR 210 and each wireless station 110 (or wireless station sector) may be assigned to only one UIR 210. According to other implementations, a UIR 210 may correspond to a tracking area (TA) or a local area data network (LADN) service area.

MEC cluster 135 may service requests from end devices 180 connected to wireless stations 110. Each MEC cluster 135 may include a UPF 235, a MEC-domain name system (DNS) 240, and a MEC instance 215. Each MEC cluster 135 may be connected within MEC network 130 by transport links 225. Each MEC cluster 135 may be communicatively coupled to one or more wireless station 110 (e.g., via wired or optical links 120) and communicatively coupled to core network 150 and/or other MEC clusters 135 via wired or optical links. In some instances, a MEC cluster 135 may be located in or geographically near one of UIRs 210.

MEC instance 215 may include a combination of hardware and software to provide application services. MEC instance 215 may include, for example, devices that support the virtualization of CPU and/or GPU services. MEC instance 215 may include various physical resources (e.g., processors, memory, storage, communication interface, etc.), software resources (e.g., operating system, etc.) and other virtualization elements (e.g., hypervisor, container engine, etc.). In the arrangement of network portion 200, the transport link 225 between any two MEC clusters 135 is optimized and the latency between any two MEC clusters is minimized. The MEC instances 215 in connected MEC clusters 135 may subscribe with each other and MEC orchestrator 140 to share information of local resource usages, forecasts, and availabilities.

UPF 235 may perform core-network-type functions at a local MEC cluster 135. UPF 235 may maintain an anchor point for intra/inter-RAT mobility, maintain an external Packet Data Network (PDN) point of interconnection to a data network (e.g., cloud platform 230), perform packet routing and forwarding, perform the user plane part of policy rule enforcement, perform packet inspection, perform traffic usage reporting, enforce QoS policies in the user plane, perform uplink traffic verification, perform transport level packet marking, perform downlink packet buffering, send and forward an "end marker" to a Radio Access Network (RAN) node (e.g., wireless station 110), and/or perform other types of user plane processes. UPF 235 may communicate with devices in core network 150 (e.g., an SMF, NEF 250, UPF 255, etc.) and external network 160.

MEC-DNS 240 may provide local DNS services for MEC cluster 135. MEC-DNS 240 may include logic that provides DNS resolution services for application services and/or microservices provided by MEC network 130. MEC-DNS 240 may serve, for example, a particular UIR 210 to update FQDNs for particular services instantiated at a local MEC instance 215. MEC-DNS 240 may receive updates from, or provide updates to, an authoritative MEC-DNS 260 in a central part of MEC network 130.

Central network 220 may include a provider network that includes or is in communication with core network 150. Central network 220 may include devices of MEC network 130, such as MEC orchestrator 140 and authoritative MEC-DNS 260.

MEC orchestrator 140 tracks of KPIs and parameters that are used in each customer's MEC application policy. Using an overlay grid, MEC Orchestrator 140 may divide a geographic coverage area into UIRs that are matched to a customer's designated coverage area for MEC services (e.g., a particular city, borough, district, etc.). The customer's designated coverage area may include multiple UIRs 210 (referred to as "target UIRs"). MEC orchestrator 140 may maintain an updated list of wireless stations 110 (or cell sites) serving the UIRs 210; an updated list of core network devices 155 (e.g., UPFs 235/255) serving the UIRs 210; and an updated list of MEC clusters 135 connected to the core infrastructure. MEC orchestrator 140 may use network data to identify a MEC cluster 135 that can support a customer's application policy. Some examples of KPIs/parameters tracked by MEC orchestrator 140 include:
 a. Minimum/maximum round trip time over-the-air from the cell-site to the boundaries of the UIRs,
 b. Min/max/average round trip time from cell-site to the UPF serving the UIR,
 c. Min/max/average round trip time from the cell-site serving the UIR to the UPF and MEC location(s),
 d. Resource availability of the MEC cluster,
 e. Backhaul availability on the MEC network, and
 f. Details of application instances running on the MEC clusters.

After MEC orchestrator 140 assigns a MEC cluster 135 for an application, MEC orchestrator 140 may receive dynamic resource updates from network functions in access network 105, MEC network 130, and core network 150 to dynamically manage MEC resources queries for end device. In relation to MEC selection and orchestration processes described herein, core network 160 may include, among other network functions, a PCF 245, a NEF 250, and a core UPF 255.

PCF 245 may support policies to control network behavior, provide policy rules to control plane functions (e.g., to an SMF (not shown)), access subscription information relevant to policy decisions, execute policy decisions, and/or perform other types of processes associated with policy enforcement. PCF 245 may specify QoS policies based on QoS flow identity (QFI) consistent with 5G network standards.

NEF 250 may expose/advertise capabilities, events, and status of network functions (NFs) to other NFs. NFs may include, for example, third party NFs, edge computing NFs (e.g., MEC clusters 135) and/or other types of NFs. For example, NEF 250 may secure provisioning of information from external applications to core network 150, translate information between core network 150 and devices/networks external to core network 150, support a Packet Flow Description (PFD) function, and/or perform other types of network exposure functions.

Core UPF 255 may enable service continuity for inter-MEC mobility events. UPF 255 may perform functions at a central level (e.g., from central network 220), similar to functions described for UPF 235 above.

Authoritative MEC-DNS 260 may provide centralized DNS services for MEC network 130. Authoritative MEC-DNS 260 may include logic that provides DNS resolution services for application services and/or micro-services provided by MEC network 130. In some implementations, authoritative MEC-DNS 260 and MEC orchestrator 140 may be combined in a single device or group of devices.

Cloud platform 230 may correspond to external network 160. Different cloud platforms 230 may use different protocols and commands. Examples of cloud platform 230 may include Amazon® Web Services (AWS), Microsoft Azure®, IBM IOT Bluemix®, etc. According to an implementation, cloud platform 230 host different application services 270 used by end devices 180. Application services 270 may, for example, work in conjunction with MEC instances 215 to provide application services to end devices 180. According to an implementation described herein, application services 270 may identify when end devices 180 enters a UIR 210 with available MEC services.

Customer device 280 may include a mobile device or a stationary computing device that is capable of communicating with other devices in network environment 100. In one implementation, customer device 280 may provide an interface to obtain a software development kit (SDK) and configurations for application programming interfaces (APIs) for use in developing applications that can use service from cloud platform 230 and/or MEC clusters 135. According to an implementation, customer device 280 may be used to select parameters (e.g., configuration files) for a MEC application policy where different geographic areas may receive different levels of MEC service.

Figure 3:
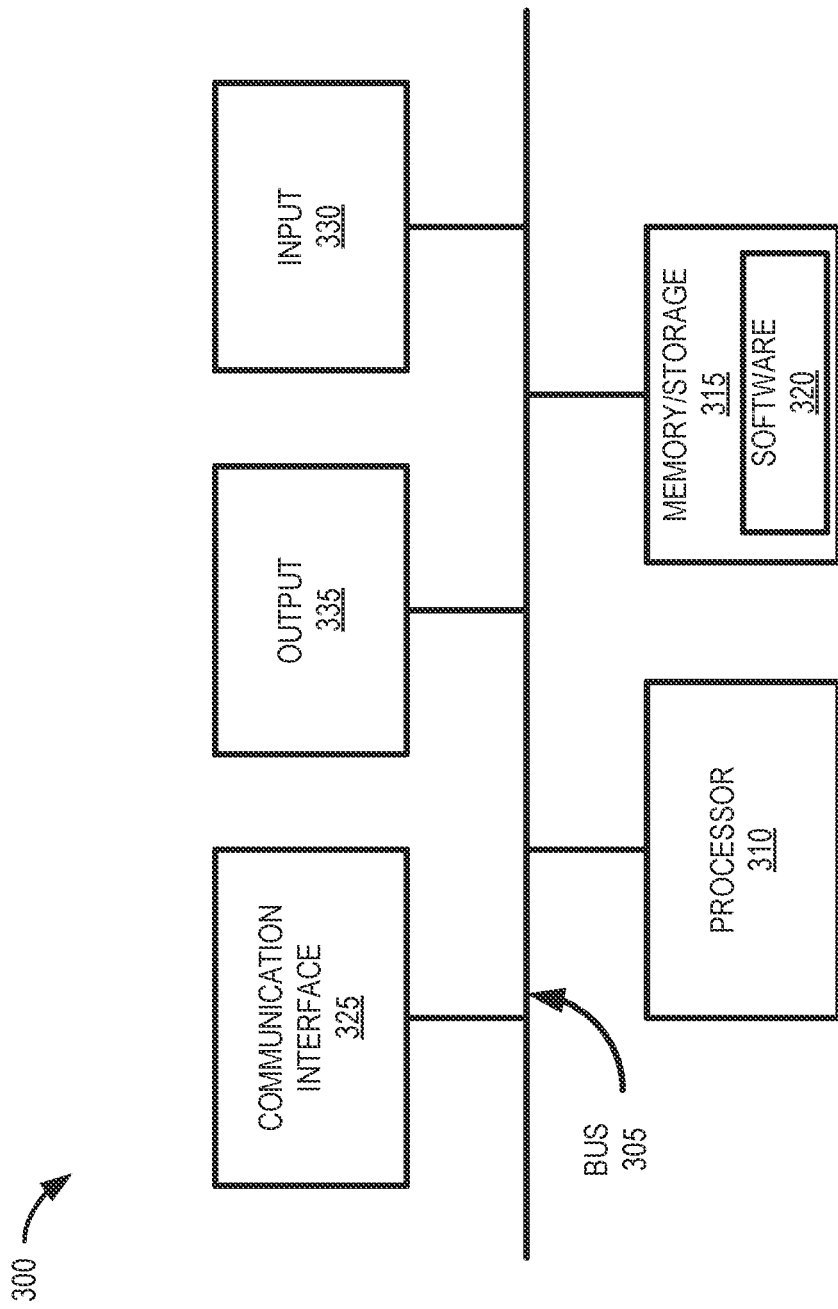
FIG. 3 illustrates exemplary components of a device that may correspond to one or more of the devices illustrated and described herein.

FIG. 3 is a diagram illustrating example components of a device 300 according to an implementation described herein. Wireless station 110, MEC orchestrator 140, network device 155, network device 165, end device 180, MEC instance 215, UPF 235, MEC-DNS 240, PCR 245, NEF 250, UPF 255, and/or cloud application service 270 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation, or a portion of operation(s), performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, MEC cluster 135 and/or MEC orchestrator 450 may include logic to perform tasks, as described herein, based on software 320. Furthermore, end devices 180 may store applications that require services/resources from MEC clusters 135.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a communication standard and/or protocols. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
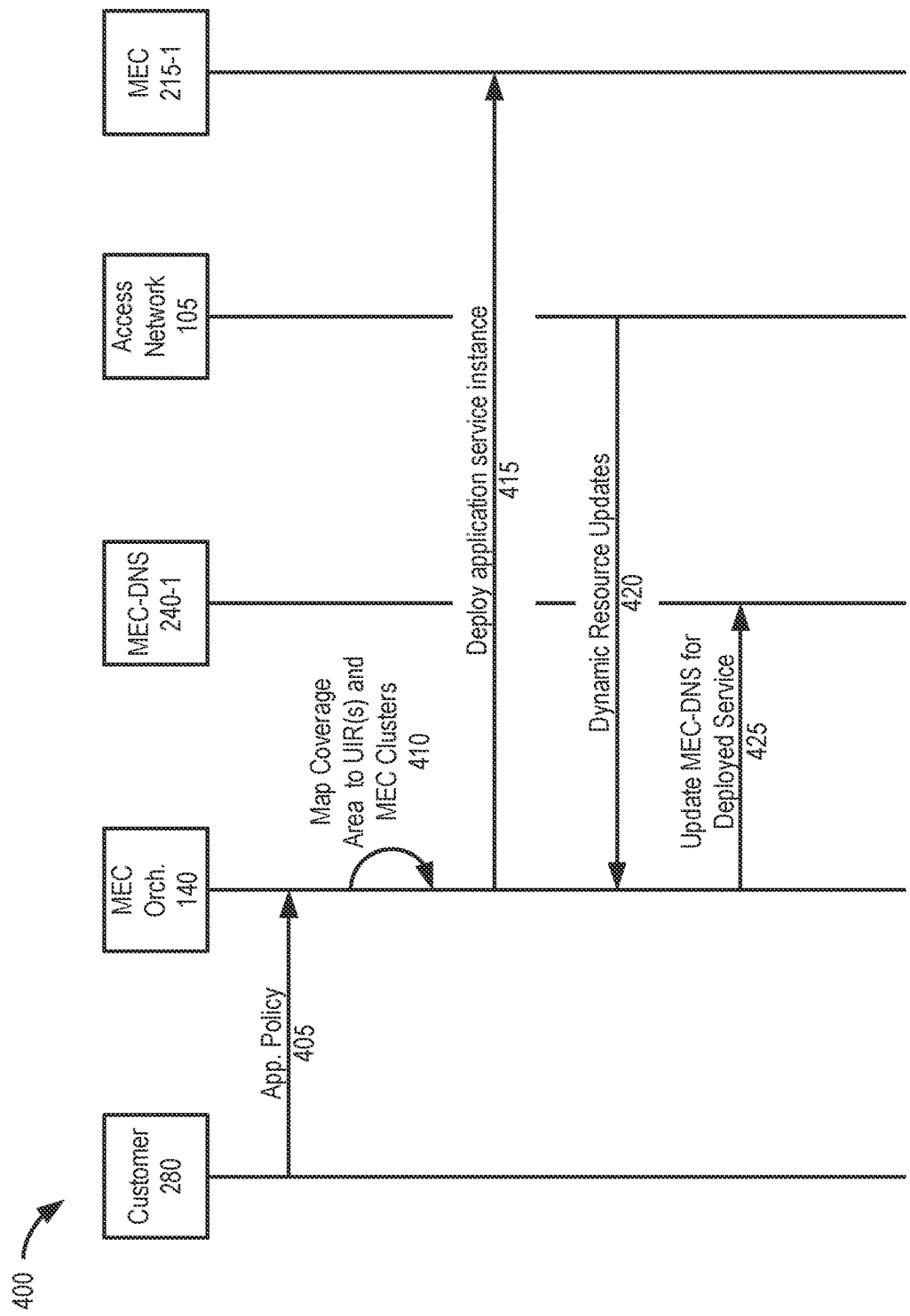
FIG. 4 is a signal flow diagram of exemplary communications for configuring MEC resources to direct a client to the optimal MEC service instance in a portion of the network of FIG. 2.

FIG. 4 is a diagram of exemplary communications for configuring MEC resources to direct a device client to the optimal MEC service instance in a portion 400 of network environment 100. Network portion 400 may include customer device 280, MEC orchestrator 140, MEC-DNS 240, access network 105 (with wireless station 110), and MEC instance 215-1 and 215-2 of MEC network 130. Communications shown in FIG. 4 provide simplified illustrations of communications in network portion 400 and are not intended to reflect every signal or communication exchanged between devices/functions. For FIG. 4, it is assumed that a geographic area that provides MEC services is divided into a set of UIRs 210.

Customer device 280 may provide to MEC orchestrator 140 an application policy 405 for MEC services. Application policy 405 may be provided, for example, as a configuration file and may define the parameters to select an MEC cluster 135 or set of MEC clusters 135 for an application. Application policy 405 may identify a requested coverage area and service parameters for that area. Customer device 280 may provide different service parameters for different coverage areas. For example, a developer may choose a higher level of MEC services for a city or borough over other areas.

FIG. 5 provides an example of fields that may be included in application policy 405. As shown in FIG. 5, application file 405 may include one or more MEC target coverage area fields 505 (e.g., 505-1, 505-2, etc.), an application service field 510, a round trip delay field 515, a guaranteed minimum throughput field 520, a data burst volume field 525, a resource field 530, a transport type field 535, a reliability level field 540, a backhaul connectivity type field 545, and a cost level field 550.

MEC target coverage area field 505 may include a city, a group of cities, a region, one or more postal zip codes, or another geographic area (e.g., a longitude/latitude, or range thereof). Entries for MEC target coverage area field 505 may be supplied, for example, as plain language input or a selection from pre-constructed options. Entries in MEC target coverage area field 505 may define an area to which other fields in application file 405 will apply. According to an implementation, application file 405 may include multiple coverage areas with different policy configurations. According to an implementation, entries in MEC target coverage area field 505 may be converted/matched to a corresponding group of UIRs 210.

Application service field 510 may include a type of service category that will be applied to the application service. Examples of an application service may include video live, video buffered, uplink streaming, voice, critical signaling, best effort, GBR, delay critical GBR, non-GBR, etc.

Round trip delay field 515 may include a maximum round-trip time or another latency value that may be associated with signals for the application. Entries for round trip delay field 515 may be supplied, for example, as numerical values (e.g., in milliseconds) or a selection from defined time ranges. Guaranteed minimum throughput field 520 may identify a minimum downlink throughput (e.g., in Mbps). Entries for minimum throughput field 520 may be supplied, for example, as numerical values (e.g., in Mbps) or selected from defined size ranges.

Data burst volume field 525 may include a maximum data burst volume or a similar flow control parameter. Data burst volume field 525 may denote the largest amount of data that the MEC network is required to serve. Entries for minimum throughput field 520 may be supplied, for example, as numerical values or selected from pre-configured size limit.

Resource field 530 may include a MEC resource type used by the application. Resource types may include, for example, compute, storage or service. Transport type field 535 may include a requested type of transport link between MEC cluster 135 and access network 105, such as IPSec, point-to-point, etc.

Reliability level field 540 may include a reliability level, such as 99.9% or 99.99% packet delivery. In another implementation, reliability level field 540 may include a corresponding descriptor (e.g., good, better, best, etc.) that corresponds to a required reliability metric. Backhaul connectivity type field 545 may include connectivity requirements from MEC instance 215 to a cloud application service 270 in cloud platform 230, such as direct connectivity or indirect connectivity.

Cost level field 550 may include a cost threshold associated with a service. For example, a developer may select from low, medium, or high cost options to indicate a customer's cost appetite. A selected cost option in cost level field 550 may be used, for example, to set a priority between conflicting MEC resource requests.

Returning to FIG. 4, MEC orchestrator 140 may receive application policy 405. In response, as indicated at reference 410, may check the requested service parameters against advertised resources on access network 105, MEC network 130, and core network 150. MEC orchestrator 140 may create a static map of the UIRs 210 that cover the requested geographic area indicated in application policy 405 (e.g., from MEC target coverage area field 505) and of the MEC clusters 135 that can serve the UIRs 210 with the requested parameters in application policy 405. According to an implementation, the "map" may include any configuration of geographic representation, table, list, or other data structure that enables a cross-reference of a geographic area with correspond coverage of cell-sites. MEC orchestrator 140 may deploy an application service instance at the identified MEC clusters 135. For example, assuming MEC orchestrator 140 identifies that MEC cluster 135-1 can support the parameters of application policy 405 for the requested area, MEC orchestrator 140 may provide instructions to MEC instance 215 to deploy an application service instance, as indicated by reference 415.

If MEC orchestrator 140 determines that a MEC cluster 135 is not available to meet parameters of application policy 405 for UIRs 210 in a requested geographic area, MEC Orchestrator 140 may elect offer a Best Effort service that points to a cloud based instance of the application service (e.g., cloud application service 270) or points to a default MEC cluster 135 that offers better performance than the cloud but with no guarantees.

Once an application is deployed, MEC orchestrator 140 may utilize cellular network intelligence parameters to maintain a dynamic view of network environment 100. For example, MEC orchestrator 140 may receive dynamic resource updates 420 from devices in access network 105 that are within the target UIRs 210. Information in dynamic resource updates 420 may include, for example:

a. average capacity utilization of radio resources in a UIR 210;
   b. UPFs 235 serving a given UIR 210;
   c. minimum/maximum round trip time (RTT) over the air from a wireless station 110 to the edge of the UIRs 210;
   d. minimum/maximum/average RTT from a wireless station 110 to a UPF 255 in core network 150 that is serving a UIR 210;
   e. minimum/maximum/average RTT from a wireless station 110 serving a UIR 210 to a local UPF 235 and MEC instance 215 in MEC cluster 135;
   f. resource availability on the MEC cluster 135 serving the UIR 210;
   g. backhaul availability on the MEC cluster 135 serving the UIR 210; and
   h. details of application instances running on MEC cluster 135.

MEC orchestrator 140 may use dynamic resource updates 420 to both evaluate network performance against service level agreements (SLAs) and manage service assignments for application service requests from end devices 180. For example, based on dynamic resource updates 420, MEC orchestrator 140 may provide a DNS update 425 to each applicable MEC-DNS 240 (e.g., MEC-DNS 240-1) with information about local MEC instances 215 that will support a fully qualified domain names (FQDN) associated with an application. According to an implementation, the MEC-DNS 240 is updated with:

a. resolution records for a FQDN (e.g., an IP address), which may be different for each UIR 210;
   b. UPF 235 identifiers serving a given UIR 210; and
   c. Fifth Generation QoS Identifier (5QI) bearer details or another bearer-type indicator (e.g., QCI-1, QCI-2, etc., with each corresponding to a type of service), which can be provided to an end device to properly implement a requested application service.

Thus, in addition to an IP address from a traditional DNS lookup, MEC-DNS 240 is also configured to provide other network information necessary to ensure an end device 180 receives MEC services that efficiently support an application policy (e.g., a UPF identifier and the type of bearer to set up for the service).

Figure 6:
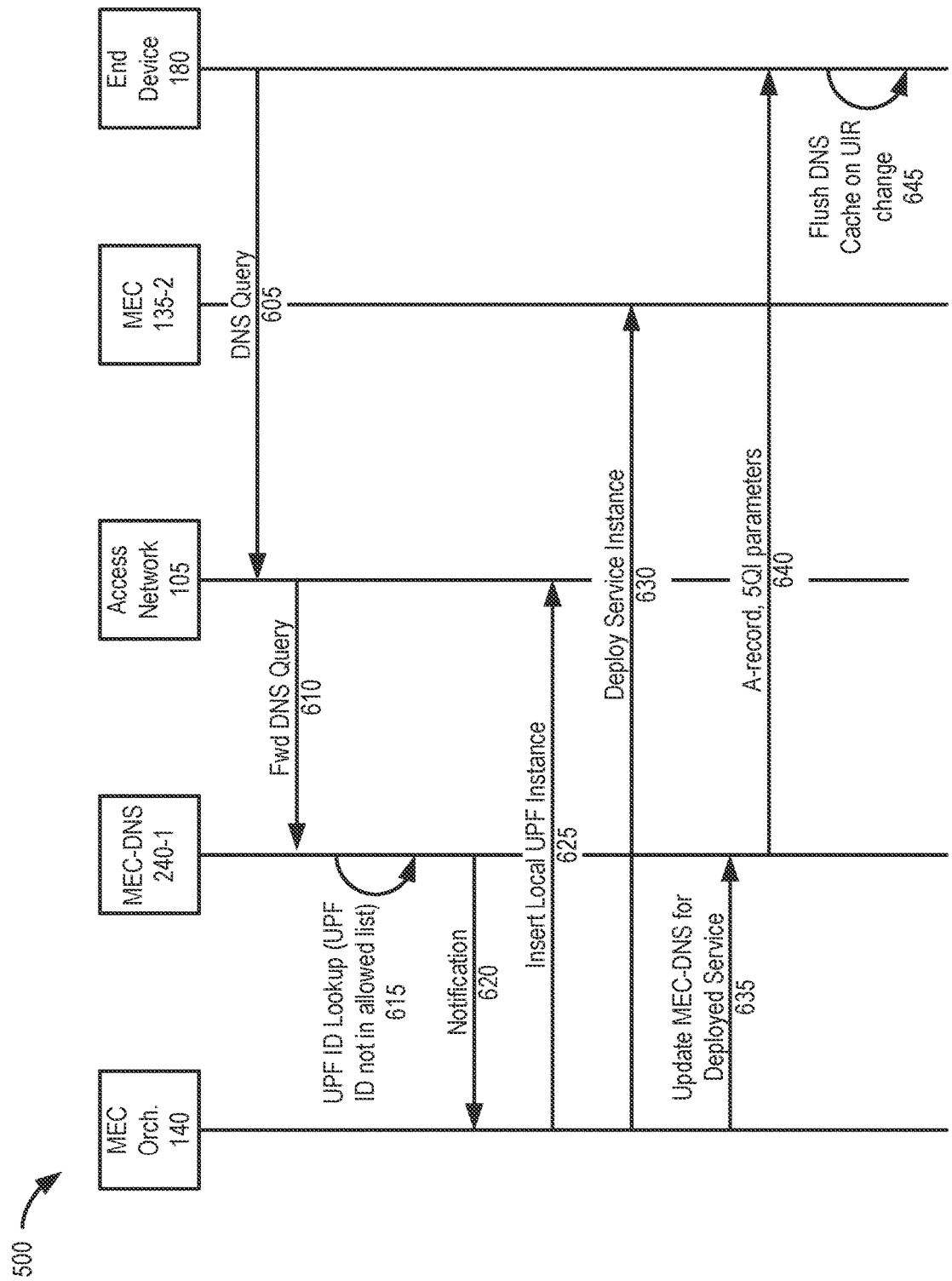
FIG. 6 is a signal flow diagram of exemplary communications for assigning MEC resources to the optimal MEC service instance in response to a request from a client in a portion of the network of FIG. 2.

FIG. 6 is a diagram of exemplary communications for assigning MEC resources to the optimal MEC service instance in response to a request from an end device client in a portion 600 of network environment 100. Network portion 600 may include MEC orchestrator 140, MEC-DNS 240-1, access network 105 (with wireless station 110), MEC instance 215-1 of MEC network 130, and end device 180. Communications shown in FIG. 6 provide simplified illustrations of communications in network portion 600 and are not intended to reflect every signal or communication exchanged between devices/functions. For FIG. 6, assume that a geographic area for MEC services is divided into a set of UIRs 210 that are optimally serviced by MEC instance 215-1 to meet an application policy.

As shown in FIG. 6, end device 180 may submit a DNS query 605. For example, an application client (e.g., software) executing on end device 180 may sends a DNS query to resolve a FQDN for an application that uses MEC services. The UPF in MEC cluster 135 serving end device 180 (e.g., UPF 235-1) forwards the DNS query to the MEC-DNS (e.g., MEC-DNS 240-1). UPF 235-1 also provides the following information to MEC-DNS 240-1 along with the DNS query: a UPF ID of the UPF 235 servicing end device 180, a UIR 210 in which end device 180 is located, and a unique identifier for end device 180 that can be used to track end device 180 in the network (e.g., an External ID or a Subscription Concealed Identifier (SUCI), for example). UPF 235-1 may forward the supplemented DNS query (e.g., DNS query 605 with the additional information) to MEC-DNS 235-1 as forwarded DNS query 610.

MEC-DNS 235-1 may receive forwarded DNS query 610 and may perform a lookup 615 of UPF ID in forwarded DNS query 610. The lookup may determine whether the UPF ID of forwarded DNS query 610 is in an allowed list to serve the UIR 210 where end device 180 is currently located. If lookup 615 reveals that UPF ID is not in the allowed list to serve the current UIR, then MEC-DNS 235-1 may trigger a notification 620 to MEC orchestrator 140. Notification 620 may indicate the unique identifier for end device 180, the current UIR 210, and the UPF ID.

MEC orchestrator 140 may receive notification 620. In response, MEC orchestrator 140 may instruct access network 105 to insert a local UPF 235 instance 625 in the flow path for end device 180 and redirect application traffic flows to/from end device 180 to the local MEC instance 215. If necessary, MEC orchestrator 140 may also instantiate an application instance 630 on the appropriate MEC instance 215, if needed.

Based on dynamic resource changes from communication references 625/630 above, MEC orchestrator 140 may provide a DNS update 635 to the MEC-DNS 240 (e.g., MEC-DNS 240-1) with information about local MEC instances 215 that will support a fully qualified domain names (FQDN) associated with the application. Similar to DNS update 425 described above, DNS update 635 may include a resolution record for a FQDN (e.g., an IP address); a UPF 235 identifier for the newly inserted UPF 235; and 5QI bearer details.

After MEC-DNS 240 receives DNS update 635, or if lookup 615 reveals that the UPF ID is in the allowed list for the current UIR 210, MEC-DNS 235-1 may return the appropriate IP address (e.g., an A-record), along with the 5QI bearer details that end device 180 can use to setup a flow between end device 180 and the appropriate MEC instance 215, as indicated by reference 640. End device 180, executing a DNS client, may perform a DNS refresh whenever end device 180 moves into a different UIR 210. The DNS refresh will clear the DNS query cache so that end device 180 will initiate a new DNS query for MEC services.

Figure 7:
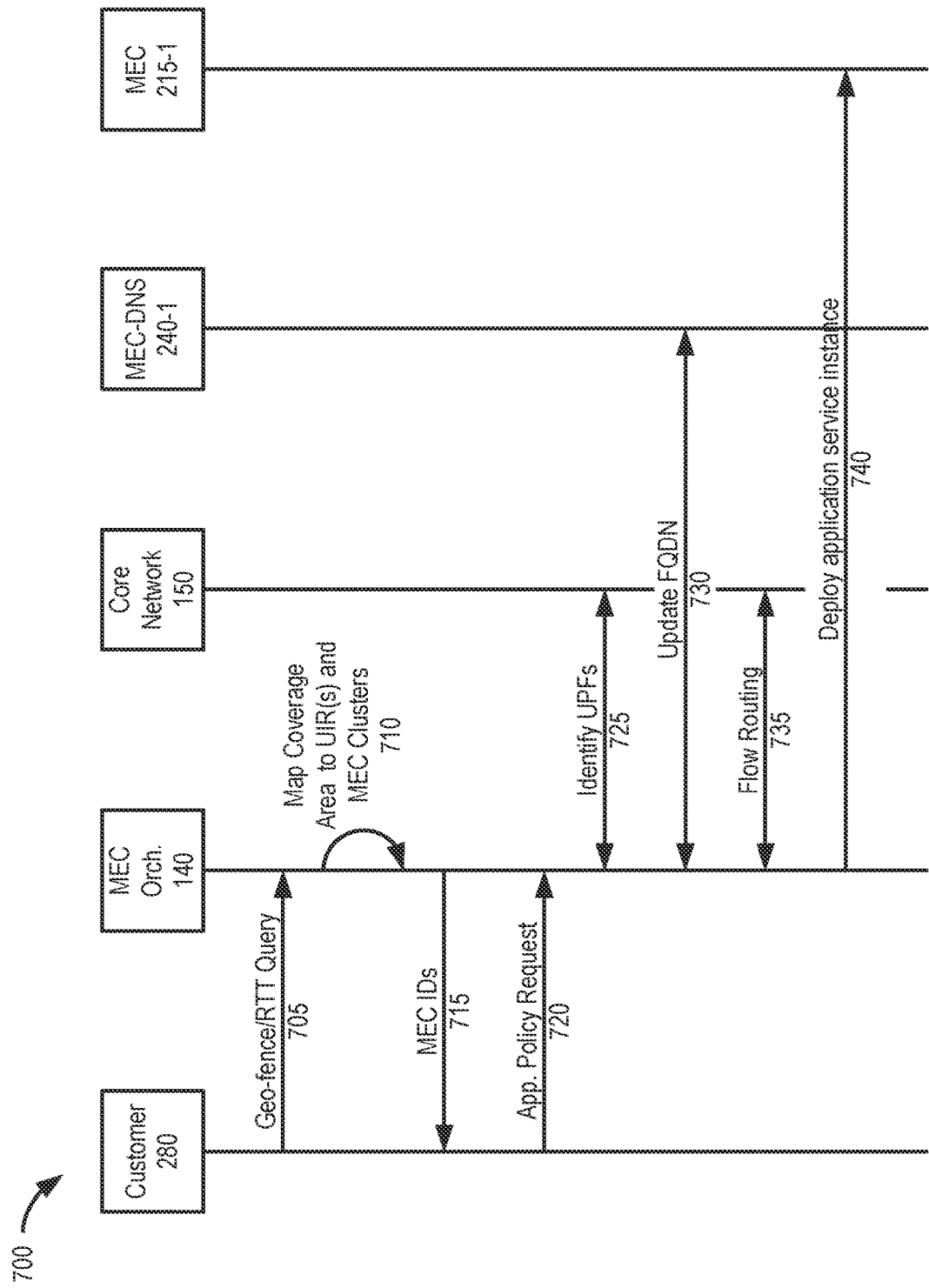
FIG. 7 is a diagram of exemplary communications for static deployment of an application instance in a portion of the network of FIG. 2.

FIG. 7 illustrates communications for a use case variant for static deployment of an application instance in a portion 700 of network 100. Network portion 700 may include customer device 280, MEC orchestrator 140, and MEC instance 215-1. Communications shown in FIG. 7 provide simplified illustrations of communications in network portion 700 and are not intended to reflect every signal or communication exchanged between devices. Communications in FIG. 7 may generally correspond to signal references 405 through 415 of FIG. 4.

Assume, in the example of FIG. 7, that a customer seeks deployment of an application instance in MEC network 130 to provide less than 30 ms round trip delay for the New York City area. Customer device 280 may provide query 705 to MEC orchestrator 140 with geo-fence information for the New York City area and the particular KPIs, which in this example would include a round trip delay of less than 30 ms.

As shown at reference 710, MEC orchestrator 140 may check the requested service parameters against advertised resources on access network 105, MEC network 130, and core network 150. MEC orchestrator 140 may create a static map of the UIRs 210 that cover the requested New York City area. MEC orchestrator 140 may return to customer device 280 a list 715 of MEC-IDs (e.g., MEC identifiers, corresponding to MEC instances 215) that satisfy the given latency requirement for the New York City area. Using list 715, customer device 280 may provide to MEC orchestrator 140 an application policy request 720 to deploy the application instance in the given MEC-IDs.

In response to application policy request 720, MEC orchestrator 140 may deploy the application on the specified MEC-IDs. As shown at reference 725, MEC orchestrator 140 may communicate with core network 150 (e.g., network device 155) to identify the UPFs serving the MEC instances 215. As shown at reference 730, MEC orchestrator 140 may communicate with the DNS instance (e.g., MEC-DNS 240-1) serving the UPF to update the FQDN for the application and point it to the new application instance on the serving MEC-IDs. As shown at reference 735, MEC orchestrator 140 may also communicate with an SDN manager (e.g., a network device 155 in core network 150) to route the application flow from the UPFs 235 to the specific MEC instances 215. MEC orchestrator 140 may then deploy 740 the application service instance at, for example, MEC instance 215-1.

Figure 8:
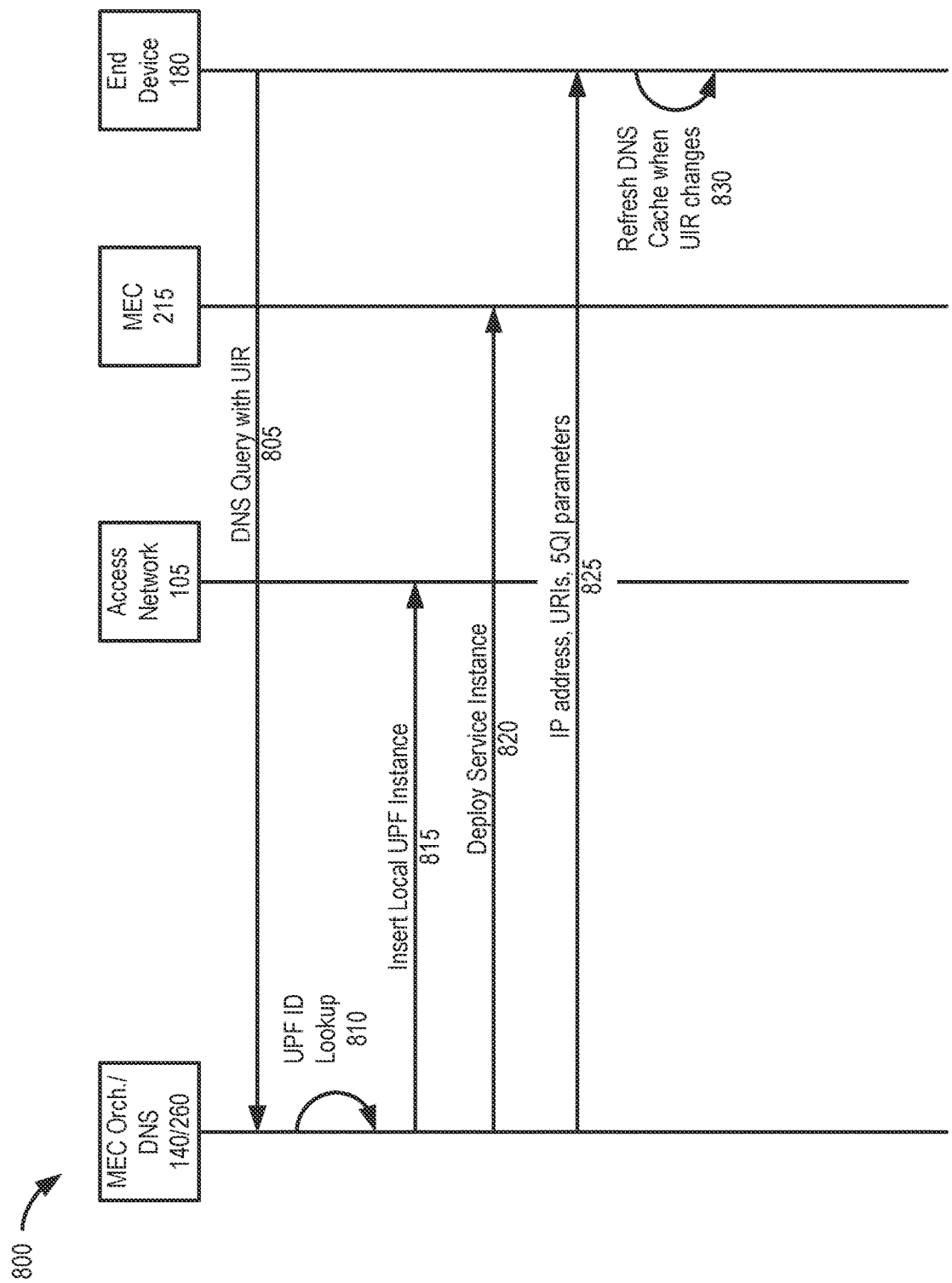
FIG. 8 is a diagram of exemplary communications for initial deployment of an application instance in a portion of the network of FIG. 2.

FIG. 8 illustrates communications for a use case variant for initial deployment of an application instance in response to an application request in a portion 800 of network 100. Network portion 800 may include access network 105, MEC orchestrator 140 with MEC DNS 260, MEC instance 215, and end device 180. Communications shown in FIG. 8 provide simplified illustrations of communications in network portion 800 and are not intended to reflect every signal or communication exchanged between devices. Communications in FIG. 8 may generally correspond to signal references 605 through 645 of FIG. 6.

In the example of FIG. 8, MEC orchestrator 140 may serve as the authoritative DNS for MEC-enabled FQDNs. In other words, MEC orchestrator 140 and authoritative MEC-DNS 260 may be combined. An application client on end device 180 may send a DNS query 805 to resolve a FQDN. The application client may provide a UIR label as part of DNS query 805. For example, a UIR label may be provided to end device 180 from cloud application service 270. As shown at reference 810, MEC orchestrator 140 may use the FQDN, the UIR, the application policy (or SLA), and dynamic MEC resource availability data to identify if a MEC instance 215 is available to serve end device 180. The selected MEC instance 215 may be based, in part, on the application policy information for a target coverage area loaded during application deployment (e.g., ref. 405, FIG. 4) and the dynamic resource updates (e.g., ref. 420).

MEC orchestrator 140 may instruct 815 the access network 105 to insert a local UPF instance in the path and redirect application traffic flows to the local MEC instance 215. MEC orchestrator 140 may instantiate 820 service at the local MEC instance 215, if it does not already exist.

MEC orchestrator 140 may send the resolved IP address back to end device 180. As shown in reference 825, MEC orchestrator 140 may also send back the UIR identifiers in which the IP address is valid. Additionally, MEC orchestrator 140 may send back information about the 5QI bearer that the UE needs to setup in order to service the FQDN. The DNS client on the end device 180 may perform a DNS refresh 830 every time end device 180 moves into a UIR 210 where the resolution is not valid.

Figure 9:
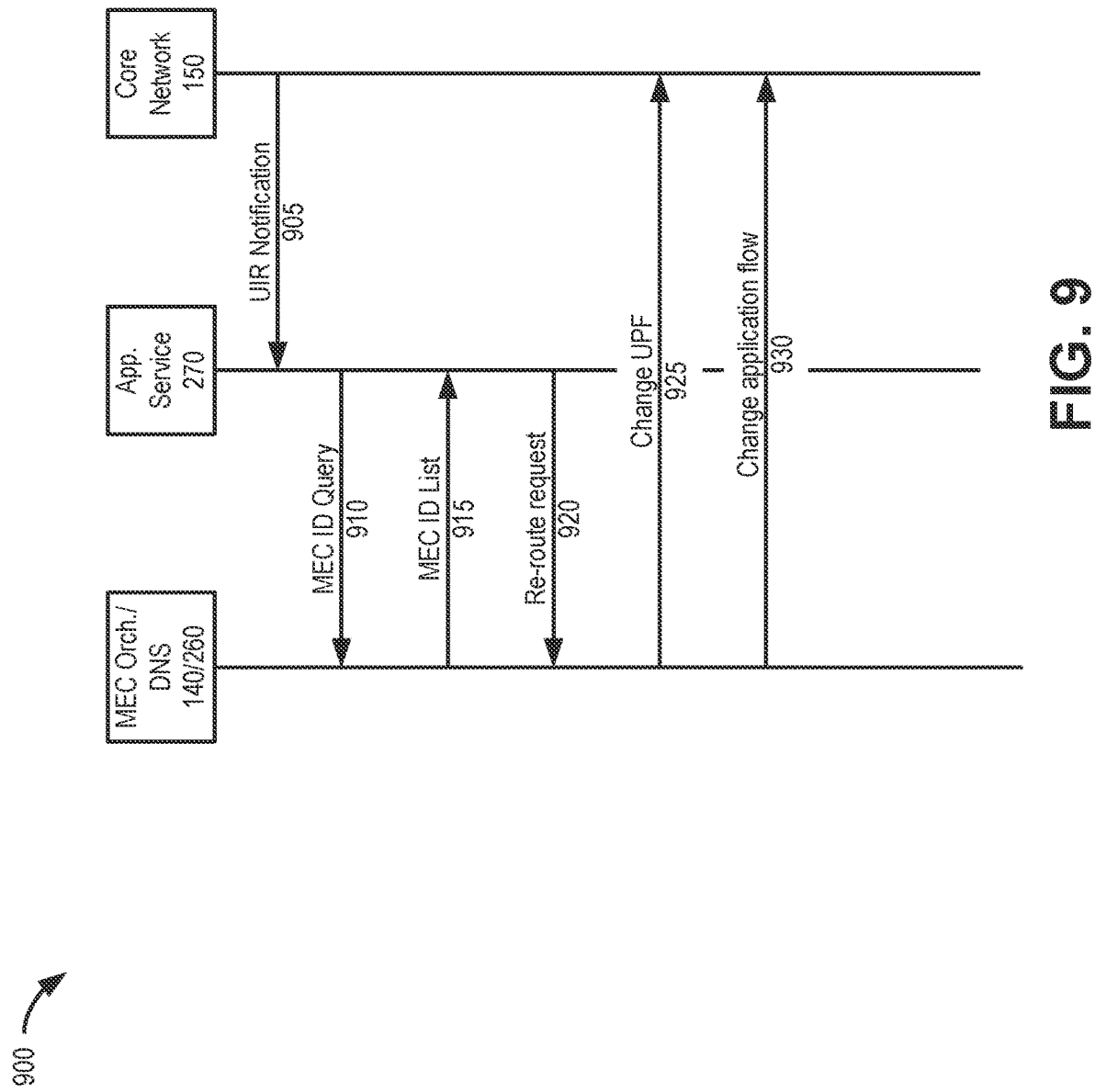
FIG. 9 is a diagram of exemplary communications for dynamic routing of an application instance in response to an application request in a portion of the network of FIG. 2.

FIG. 9 illustrates communications for a use case variant for dynamic routing of an application instance in response to an application request in a portion 900 of network 100. Network portion 900 may include MEC orchestrator 140 with authoritative MEC-DNS 260, core network 150, and application service 270. Communications shown in FIG. 9 provide simplified illustrations of communications in network portion 900 and are not intended to reflect every signal or communication exchanged between devices. Furthermore, some communications shown in FIG. 9 may be indirect.

In the example of FIG. 9, assume an application client on end device 180 is already running an application and communicating with cloud application service 270. Further assume, an instance of the application is already deployed in a given set of MEC instances 215 serving a particular UIR 210. Assume also that a customer/developer has subscribed to a service from core network 150 that notifies the application when an end device 180 enters a UIR 210.

When end device 180 (not shown in FIG. 9), executing the application client, enters the UIR, the cloud application service 270 may be notified, as indicated by reference 905. Cloud application service 270 may query 910 MEC orchestrator 140 for a list of MEC-IDs that serve the current UIR (e.g., MEC instances 215 that are available and can meet the SLA requirements for that UIR 210). MEC orchestrator 140 may return a list of MEC-IDs 915.

Cloud application service 270 may submit a re-route request 920 to MEC orchestrator 140 to route the application traffic flow to/from end device 180 to the application instance on the selected MEC instance 215. In response, as shown in reference 925, MEC orchestrator 140 may instruct core network 150 to move the traffic anchor for the application flow to the UPF instance 235 serving the given MEC instance 215. Additionally, as shown in reference 930, MEC orchestrator 140 may instructs the SDN manager to route the application flow to the application instance on the MEC-ID.

Figure 10:
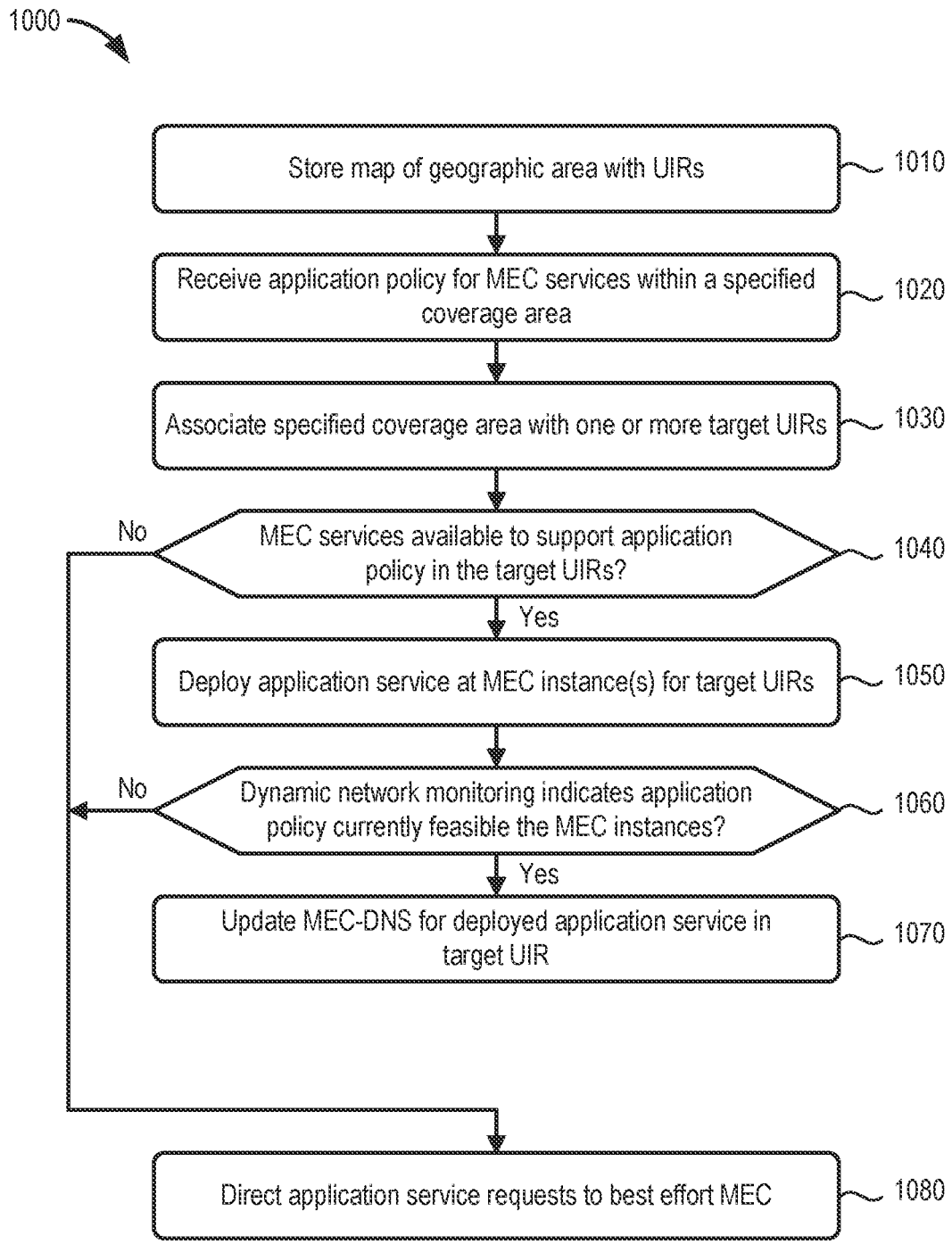
FIG. 10 is a flow diagram illustrating an exemplary process for managing and selecting resources in MEC network, according to implementations described herein.

FIG. 10 is a flow diagram illustrating an exemplary process 1000 for managing and selecting resources in MEC network 130. In one implementation, process 1000 may be implemented by an MEC orchestrator 140. In another implementation, process 1000 may be implemented by MEC orchestrator 140 in conjunction with one or more MEC clusters 135 or other devices in network environment 100.

As shown in FIG. 10, a map of a geographic area with UIRs may be stored (block 1010). For example, MEC orchestrator 140 may maintain an overlay grid over an entire geographic coverage area (e.g., a region, country, etc.). The overlay grid may divide the geographic coverage area into UIRs 210.

Process 1000 may also include receiving an application policy for MEC services within a specified coverage area (block 1020) and associating a specified coverage area with one or more target UIRs (block 1030). For example, as described above in connection with FIG. 4, MEC orchestrator 140 may receive an application policy 405 from a customer device 280. Application policy 405 may designate a coverage area and service parameters for that area. MEC orchestrator 140 may map the requested coverage area to a set of UIRs 210 and MEC instances 135 that support the set of UIRs 210. Alternatively, as described in connection with FIG. 7, customer device 280 and MEC orchestrator 140 may exchange a series of communications 705-72—to provide an application policy for a particular target area.

Process 1000 may further include determining if MEC services are available to support the application policy in the target UIRs (block 1040). For example, MEC orchestrator 140 may evaluate static network configuration information from advertised resources on access network 105, MEC network 130, and core network 150 to determine if there are available resources to support parameters (e.g., customer-specified KPIs) of the application policy in the target UIRs 210.

If MEC services are available to support the application policy in the target UIRs (block 1040—Yes), application services may be deployed at MEC instances for the target UIRs (block 1050), and it may be dynamically determined if the application policy is currently feasible in the MEC instances (block 1060). For example, assuming MEC orchestrator 140 identifies that a MEC cluster 135 can support the parameters of an application policy for target UIRs 210, MEC orchestrator 140 may provide instructions to, for example, MEC instance 215-1 to deploy the application service instance. MEC orchestrator 140 may receive dynamic resource updates (e.g., dynamic resource updates 420) from devices in access network 105 that are within the target UIRs 210 and use the dynamic resource updates to both evaluate network performance against service level agreements (SLAs) and manage service assignments for application service requests from end devices 180.

If the application policy is currently feasible in the MEC instances (block 1060—Yes), the MEC-DNS may be updated for the deployed application service in the target UIR (block 1070). For example, based on dynamic resource updates 420, MEC orchestrator 140 may provide a DNS update to each applicable MEC-DNS 240 with information about local MEC instances 215 that will support a fully qualified domain names (FQDN) associated with an application when end device 180 is in a target UIR 210.

If MEC services are not available to support the application policy in the target UIRs (block 1040—No) or if the application policy is not currently feasible in the MEC instances (block 1060—No), application service requests may be directed to a best effort MEC instance to service an application on end device 180 in a target UIR 210. For example, MEC orchestrator 140 may direct application service requests to a cloud based instance of the application (e.g., cloud application service 270) or points to a default MEC location (MEC cluster 135) that offers better performance than cloud service but with no guarantees.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks or signal shave been described with regard to the processes illustrated in FIGS. 4 and 6-10, the order of the blocks or signals may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A system comprising:
    a first network device including one or more first processors configured to:
        receive a policy for an application to receive multi-access edge computing (MEC) services, the policy designating a coverage area for the MEC services and application service parameters for the application in the coverage area,
        match the coverage area for the MEC services to one or more unique identifiable regions (UIRs) that each include cells for different wireless stations of a transport network,
        deploy, at a MEC cluster, an instance of the application when edge computing resources of the MEC cluster are available to support the application service parameters in the one or more UIRs,
        update, based on dynamic resource updates from devices in an access network, a MEC-domain name service (DNS) located in the MEC cluster to reflect a fully qualified domain name (FQDN) and a bearer-type indicator for the MEC services for the instance of the application; and
    a second network device including one or more second processors configured to:
        receive a DNS query for the application, wherein the DNS query includes an identifier for a UIR, and
        return, in response to the DNS query, an address for the MEC cluster available to service the application and the bearer-type indicator.

2. The system of claim 1, wherein, when updating the MEC-DNS, the one or more first processors are further configured to:
    send, to the MEC-DNS, a DNS update message, wherein the DNS update message includes the bearer-type indicator and a user plane function (UPF) identifier for a UPF in the MEC cluster.

3. The system of claim 1, wherein, when updating the MEC-DNS, the one or more first processors are further configured to:
    provide a resolution record for the fully qualified domain names (FQDN) associated with the instance of the application.

4. The system of claim 1, wherein, when updating the MEC-DNS, the one or more first processors are further configured to:
    provide an identifier for a user plane function (UPF) serving the one or more UIRs.

5. The system of claim 1, wherein the one or more UIRs include one or more of:
    a tracking area (TA), or
    a local area data network (LADN) service area.

6. The system of claim 1, wherein the first network device is included in a core network for the transport network.

7. The system of claim 1, wherein the one or more first processors are further configured to:
    determine, based on advertised resources in the transport network, whether the edge computing resources are available to support the application service parameters.

8. The system of claim 7, wherein, when determining whether the edge computing resources are available, the one or more first processors are further configured to:

monitor over-the-air round trip time between different wireless stations serving in the one or more UIRs and end devices in the one or more UIRs, monitor round trip time between the different wireless stations and a user plane function (UPF) in a core network, or monitor round trip time from the different wireless stations and the MEC cluster.

9. The system of claim 1, wherein the application service parameters include different designated coverage areas with different sets of parameters for each of the different designated coverage areas.

10. A method, comprising:

receiving, by a network device, a policy for an application to receive multi-access edge computing (MEC) services, the policy designating a coverage area for the MEC services and application service parameters for the application in the coverage area;

matching, by the network device, the coverage area for the MEC services to one or more unique identifiable regions (UIRs) that each include cells for different wireless stations of a transport network;

initiating, by the network device and at a MEC cluster, an instance of the application when edge computing resources of the MEC cluster are available to support the application service parameters in the one or more UIRs;

updating, by the network device and based on dynamic resource updates from devices in an access network, a MEC-domain name service (DNS) located in the MEC cluster to reflect a fully qualified domain name (FQDN) and a bearer-type indicator for the MEC services for the instance of the application;

receiving, by the MEC-DNS, a DNS query for the application, wherein the DNS query includes an identifier for a UIR; and return, by the MEC-DNS and in response to the DNS query, an address for the MEC cluster available to service the application and the bearer-type indicator.

11. The method of claim 10, wherein updating the MEC-DNS further comprises:

sending, to the MEC-DNS, a DNS update message, wherein the DNS update message includes the bearer-type indicator and a user plane function (UPF) identifier for a UPF in the MEC cluster.

12. The method of claim 10, wherein updating the MEC-DNS further comprises:

providing to the MEC-DNS multiple UPF identifiers for different UPFs serving the one or more UIRs.

13. The method of claim 10, further comprising:

determining, based on advertised resources in the transport network, whether the edge computing resources are available to support the application service parameters.

14. The method of claim 10, wherein the network device is included in a core network for the transport network.

15. The method of claim 10, further comprising:

receiving, from devices in the transport network, dynamic resource updates that indicate a current availability to support the instance of the application.

16. The method of claim 10, further comprising:

identifying the MEC cluster available to service the application based on the identifier for the UIR and the application service parameters.

17. The method of claim 10, wherein the application service parameters designate different coverage areas with different sets of parameters for each of the different coverage areas.

18. A non-transitory, computer-readable storage media storing instructions executable by one or more processors, the instructions comprising:

receiving a policy for an application to receive multi-access edge computing (MEC) services, the policy designating a coverage area for the MEC services and application service parameters for the application in the coverage area, matching the coverage area for the MEC services to one or more unique identifiable regions (UIRs) that each include cells for different wireless stations of a transport network;

initiating, at a MEC cluster, an instance of the application when edge computing resources of the MEC cluster are available to support the application service parameters in the one or more UIRs;

updating, based on dynamic resource updates from devices in transport network, a MEC-domain name service (DNS) located in the MEC cluster to reflect a fully qualified domain name (FQDN) and a bearer-type indicator for the MEC services for the instance of the application;

receiving a DNS query for the application, wherein the DNS query includes an identifier for a UIR; and return, in response to the DNS query, an address for the MEC cluster available to service the application and the bearer-type indicator.

19. The non-transitory, computer-readable storage media of claim 18, further comprising instructions for:

determining, based on advertised resources in a transport network, whether the edge computing resources are available to support the application service parameters.

20. The non-transitory, computer-readable storage media of claim 18, wherein the dynamic resource updates indicate a current availability to support the instance of the application.

* * * * *